United States Patent Office 2,789,122
Patented Apr. 16, 1957

2,789,122

AMINOALKYL TRIMETHYLSILYLBENZOATES

Louis F. Cason and James R. Rhone, Tuskegee, Ala., assignors to Tuskegee Institute, Tuskegee, Ala., a corporation of Alabama No Drawing. Application July 28, 1954,
Serial No. 446,400

20 Claims. (Cl. 260—448.2)

The present invention relates to novel aminoalkyl benzoates and their preparation. More particularly, the invention relates to aminoalkyl trimethylsilylbenzoates, acid addition and quaternary ammonium salts thereof, and to a process for the preparation of these compounds.

The compounds of the invention are represented by the formula:

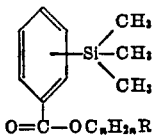

wherein $n$ is an integer from one to six inclusive and R is a secondary-amino radical, i. e., a radical obtained by removing the N-attached hydrogen atom of a secondary amine, and acid addition and quaternary ammonium salts thereof.

The aminoalkyl trimethylsilylbenzoates of the invention are characterized by physiological activity and more particularly, analgetic and local anesthetic activity.

It is an object of the present invention to provide the new and novel aminoalkyl trimethylsilylbenzoates and acid addition and quaternary ammonium salts thereof. Another object of the invention is to provide a process for the preparation of these compounds. Other objects and features of the invention will be apparent to those skilled in the art to which this invention pertains.

The process of the invention comprises reacting a trimethylsilylbenzoyl halide with a secondary-aminoalkanol to form the corresponding trimethylsilylbenzoic acid ester.

In a more specific and preferred embodiment of this invention, a trimethylsilylbenzoyl halide such as a trimethylsilylbenzoyl chloride, a trimethylsilylbenzoyl bromide, and the like, is esterified with a secondary-aminoalkanol such as, for example, dimethylaminoethanol, dimethylaminomethanol, diethylaminomethanol, diethylaminoethanol, diethylaminopropanol, diethylaminobutanol, diethylaminopentanol, diethylaminohexanol, dipropylaminoethanol, diisopropylaminoethanol, dipropylaminopropanol, dibutylaminoethanol, dibutylaminopropanol, methylethylaminoethanol, methyl-n-propylaminoethanol, methylhexylaminoethanol, and the like. Other secondary-aminoalkanols which can be used include dicycloalkylaminoalkanols such as, for example, dicyclobutylaminoethanol, dicyclohexylaminoethanol, and the like; alkylaralkylaminoalkanols such as, for example, methylbenzylaminomethanol, ethylbenzylaminoethanol, propylbenzylaminoethanol, and the like; diaralkylaminoalkanols such as, for example, dibenzylaminoethanol, diphenethylaminoethanol, and the like; heterocyclic aminoalkanols such as, for example, pyrrolidylmethanol, pyrrolidylethanol, pyrrolidylbutanol, piperidylethanol, piperidylpropanol, morpholinylethanol, morpholinylpentanol, and the like; carbon-substituted pyrrolidyl-, piperidyl-, and morpholinylalkanols such as, for example, 2-methylpyrrolidylethanol, 2,2-dimethylpyrrolidylethanol, 2-ethylpyrrolidylethanol, 2-, 3-, and 4-methylpiperidylethanols, 2-, 3-, and 4-ethylpiperidylethanols, 2- and 3-methylmorpholinylethanols, 2- and 3-ethylmorpholinylethanols, and the like. The product of the reaction is a hydrohalide of an aminoalkyl trimethylsilylbenzoate which can then be converted to the free base, if desired, by treatment with an alkali such as ammonium hydroxide, potassium hydroxide, sodium hydroxide, and the like.

In the preparation of a hydrohalide of an aminoalkyl trimethylsilylbenzoate, the reaction is conducted preferably under substantially anhydrous conditions in the presence of an inert solvent, such as aromatic hydrocarbons, e. g., benzene, toluene, xylene, and the like; ethers such as diethyl ether, diisopropyl ether, dibutyl ether, and the like; aliphatic hydrocarbons such as petroleum naphtha, and the like; and chlorinated hydrocarbons such as chloroform, carbon tetrachloride, and the like. The reaction temperature is maintained between about zero and about 150 degrees centigrade and preferably between about twenty and about 125 degrees centigrade. It is obvious that the reaction time will depend on the reaction temperature employed. Ordinarily, it is preferred to use stoichiometric amounts, i. e., equimolar proportions, of a trimethylsilylbenzoyl halide and a secondary-aminoalkanol, although satisfactory results can likewise be obtained by employing an excess of either of these reactants.

Due to the presence of basic nitrogen in the molecule, the aminoalkyl trimethylsilylbenzoates react with acids to form acid addition salts. Representative acids which can be used include mineral acids such as hydrogen chloride, hydrogen bromide, sulfuric acid, thiocyanic acid, and the like; aliphatic carboxylic acids such as acetic acid, lactic acid, tartaric acid, citric acid, succinic acid, and the like; aromatic acids such as benzoic acid, salicylic acid, and the like; and strongly acidic phenols such as picric acid, and the like. On condensing the thiocyanate salts with formaldehyde, pickling inhibitors are obtained according to the procedure disclosed in U. S. Patents 2,425,320 and 2,606,155.

Various procedures can be used to prepare the acid addition salts of the aminoalkyl trimethylsiliylbenzoates of the invention. A convenient or preferred method involves reacting the tertiary amine with an acid in a solvent such as ether, alcohol, or a mixture of alcohol and ethyl acetate. Upon removal of the solvent, the acid addition salt remains as a residue which can then be purified by recrystallization from solvents such as alcohol, methyl ethyl ketone, ethyl acetate, and the like. In many instances, particularly where ether is used, the acid addition salt is crystallized from the solvent. Other methods for preparing acid addition salts of the aminoalkyl trimethylsilylbenzoates of the invention may also be used and are known to the art.

Quaternary ammonium salts of the aminoalkyl trimethylsilylbenzoates of the invention can likewise be prepared by any convenient manner known in the art such as, for example, by mixing an aminoalkyl trimethylsilylbenzoate with a selected ester in the presence of an organic solvent in which the resulting quaternary ammonium salt is relatively insoluble so that precipitation occurs upon formation thereof. Alternatively, the aminoalkyl trimethylsilylbenzoate and selected salt-forming agent are mixed together, heated to complete the reaction and the solid quaternary ammonium salt of the aminoalkyl trimethylsilylbenzoate is thereafter isolated. Representative esters which can be used to form quaternary ammonium salts of aminoalkyl trimethylsilylbenzoates include alkyl halides, aralkyl halides, and alkyl esters of arylsulfonic acids such as, for example, methyl bromide, methyl iodide, cetyl bromide, myristyl iodide, lauryl bromide, benzyl chloride, allyl bromide, ethyl para-toluenesulfonate, and the like.

The following preparations and examples illustrate the process and products of the present invention but are not to be construed as limiting.

Preparation 1.—p-Trimethylsilylbenzoyl chloride

To five grams (0.03 mole) of p-trimethylsilylbenzoic acid [Roberts et al., J. Am. Chem. Soc. 71, 2923–6 (1949)] in fifty milliliters of sodium-dried ether is added 2.1 grams (0.03 mole) of pyridine. Accompanied by stirring, 3.2 grams (0.03 mole) of thionyl chloride in 25 milliliters of anhydrous ether is added. After stirring the reaction mixture for thirty minutes, the pyridine hydrochloride is removed by filtration. The ether is removed by distillation and the residue is vacuum distilled, the fraction boiling between 117 and 118 degrees centigrade at four millimeters of mercury pressure being collected. There is obtained a yield of 3.75 grams (83 percent) of p-trimethylsilylbenzoyl chloride. The product is characterized by an index of refraction $n_D^{30}=1.5305$, and a density $d_{20}^{20}$ 1.0691.

Preparation 2.—o-Trimethylsilylbenzoyl chloride 236 grams of o-dibromobenzene (one mole) is reacted in anhydrous ether with 24.5 grams (one mole) of magnesium turnings to produce o-bromophenyl magnesium bromide. Upon reacting this Grignard reagent with 108.5 grams (one mole) of chlorotrimethylsilane, o-bromophenyltrimethylsilane is obtained. The latter is reacted in anhydrous ether with magnesium turnings to produce o-trimethylsilylphenyl magnesium bromide; carbonation of this Grignard reagent with a large excess of carbon dioxide produces o-trimethylsilylbenzoic acid. This acid is reacted with thionyl chloride in anhydrous ether in the presence of pyridine. Upon removing pyridine hydrochloride by filtration and the ether by distillation, there is obtained a residue consisting of o-trimethylsilylbenzoyl chloride which can be used for reaction purposes without further purification, or if desired, can be purified, e. g., by fractional distillation.

o- or p-Trimethylsilylbenzoic acid can be converted to the corresponding o- or p-trimethylsilylbenzoyl chloride by reaction with other inorganic acid chlorides such as phosphorus trichloride, phosphorus pentachloride, and the like.

Upon reacting o- or p-trimethylsilylbenzoic acid with inorganic acid bromides such as thionyl bromide, phosphorus tribromide, phosphorus pentabromide, and the like, the corresponding o- or p-trimethylsilylbenzoyl bromide is obtained.

Example 1.—β-Diethylaminoethyl p-trimethylsilylbenzoate

A solution containing 10.5 grams (0.05 mole) of p-trimethylsilylbenzoyl chloride (preparation 1) in fifty milliliters of anhydrous benzene is mixed with a solution of 5.8 grams (0.05 mole) of β-diethylaminoethanol in fifty milliliters of anhydrous benzene. The resulting mixture is then refluxed for three hours. On cooling, the β-diethylaminoethyl p-trimethylsilylbenzoate hydrochloride crystallizes and is isolated by suction filtration. On recrystallization from benzene, there is obtained substantially pure β-diethylaminoethyl p-trimethylsilylbenzoate hydrochloride melting between 164 and 165 degrees centigrade and weighing 12.7 grams (eighty percent yield).

Analysis.—Calculated for $C_{16}H_{28}ClNO_2Si$: N, 4.25; S, 8.51. Found: N, 4.31; S, 8.13; N, 4.41; S, 8.14.

β-Diethylaminoethyl p-trimethylsilylbenzoate hydrochloride exhibits antibacterial activity, and particularly against S. haemolyticus.

The free base is obtained by dissolving β-diethylaminoethyl p-trimethylsilylbenzoate hydrochloride in water and then making the resulting solution basic with concentrated ammonium hydroxide. The free base thus formed is extracted with ether. The ether solution is dried with anhydrous sodium sulfate and the ether is removed by suitable means such as distillation. β-Diethylaminoethyl p-trimethylsilylbenzoate is thus obtained in substantially pure form.

By substituting p-trimethylsilylbenzoyl bromide in the above reaction, the corresponding β-diethylaminoethyl p-trimethylsilylbenzoate hydrobromide is obtained. On treating an aqueous solution of β-diethylaminoethyl p-trimethylsilylbenzoate hydrobromide with an alkali, as indicated above, β-diethylaminoethyl p-trimethylsilylbenzoate is obtained.

On reacting β-diethylaminoethyl p-trimethylsilylbenzoate with acids such as, for example, acetic acid, citric acid, sulfuric acid, hydrogen chloride, hydrogen bromide, thiocyanic acid, lactic acid, tartaric acid, succinic acid, benzoic acid, salicylic acid, picric acid, and the like, the corresponding acid addition salts of β-diethylaminoethyl p-trimethylsilylbenzoate are obtained such as, for example, β-diethylaminoethyl p-trimethylsilylbenzoate acetate, β-diethylaminoethyl p-trimethylsilylbenzoate citrate, β-diethylaminoethyl p-trimethylsilylbenzoate sulfate, β-diethylaminoethyl p-trimethylsilylbenzoate hydrochloride, β-diethylaminoethyl p-trimethylsilylbenzoate hydrobromide, β-diethylaminoethyl p-trimethylsilylbenzoate thiocyanate, β-diethylaminoethyl p-trimethylsilylbenzoate lactate, β-diethylaminoethyl p-trimethylsilylbenzoate tartrate, β-diethylaminoethyl p-trimethylsilylbenzoate succinate, β-diethylaminoethyl p-trimethylsilylbenzoate benzoate, β-diethylaminoethyl p-trimethylsilylbenzoate salicylate, β-diethylaminoethyl p-trimethylsilylbenzoate picrate, and the like.

By heating a benzene solution of β-diethylaminoethyl p-trimethylsilylbenzoate and methyl bromide and cooling and concentrating the resulting solution, β-diethylaminoethyl p-trimethylsilylbenzoate methobromide is obtained.

Similarly, by reacting β-diethylaminoethyl p-trimethylsilylbenzoate with other selected esters such as, for example, ethyl chloride, benzyl chloride, methyl iodide, cetyl bromide, myristyl iodide, lauryl bromide, allyl bromide, ethyl p-toluenesulfonate, and the like, the corresponding quaternary ammonium salts of β-diethylaminoethyl p-trimethylsilylbenzoate are obtained such as, for example, β-diethylaminoethyl p-trimethylsilylbenzoate ethochloride, β-diethylaminoethyl p-trimethylsilylbenzoate benzyl chloride, β-diethylaminoethyl p-trimethylsilylbenzoate methiodide, β-diethylaminoethyl p-trimethylsilylbenzoate cetyl bromide, β-diethylaminoethyl p-trimethylsilylbenzoate myristyl iodide, β-diethylaminoethyl p-trimethylsilylbenzoate lauryl bromide, β-diethylaminoethyl p-trimethylsilylbenzoate allyl bromide, β-diethylaminoethyl p-trimethylsilylbenzoate ethyl p-toluenesulfonate, and the like.

On substituting either an o-trimethylsilylbenzoyl halide such as o-trimethylsilylbenzoyl chloride, o-trimethylsilylbenzoyl bromide (preparation 2), and the like, or an m-trimethylsilylbenzoyl halide such as m-trimethylsilylbenzoyl chloride [Benkeser et al., J. Am. Chem. Soc. 75, 2421–5 (1953)], m-trimethylsilylbenzoyl bromide (obtained by reacting m-trimethylsilylbenzoic acid—Roberts et al., supra—with an inorganic acid bromide), and the like, for p-trimethylsilylbenzoyl chloride in the above reaction, the corresponding β-diethylaminoethyl o-trimethylsilylbenzoate or β-diethylaminoethyl m-trimethylsilylbenzoate is obtained.

Similarly, using the procedure described supra, acid addition and quaternary ammonium salts of β-diethylaminoethyl o-trimethylsilylbenzoate or β-diethylaminoethyl m-trimethylsilylbenzoate are obtained such as, for example, β-diethylaminoethyl o- and m-trimethylsilylbenzoate hydrochloride, β-diethylaminoethyl o- and m-trimethylsilylbenzoate acetate, β-diethylaminoethyl o- and m-trimethylsilylbenzoate citrate, β-diethylaminoethyl o- and m-trimethylsilylbenzoate sulfate, β-diethylaminoethyl o- and m-trimethylsilylbenzoate hydrobromide, β-diethylaminoethyl o- and m-trimethylsilylbenzoate thiocyanate, β-diethylaminoethyl o- and m-trimethylsilylbenzoate lactate, β-diethylaminoethyl o- and m-trimethylsilylbenzoate tartrate, β-diethylaminoethyl o- and m-trimethylsilylbenzoate succinate, β-diethylaminoethyl o- and m-trimethylsilylbenzoate benzoate, β-diethylaminoethyl o- and m-trimethylsilylbenzoate salicylate, β-diethylaminoethyl o- and m-trimethylsilylbenzoate picrate, β-diethylaminoethyl o- and m-trimethylsilylbenzoate methobromide, β-diethylaminoethyl o- and m-trimethylsilylbenzoate ethochloride, β-diethylaminoethyl o- and m-trimethylsilylbenzoate benzyl chloride, β-diethylaminoethyl o- and m-trimethylsilylbenzoate methiodide, β-diethylaminoethyl o- and m-trimethylsilylbenzoate cetyl bromide, β-diethylaminoethyl o- and m-trimethylsilylbenzoate myristyl iodide, β-diethylaminoethyl o- and m-trimethylsilylbenzoate lauryl bromide, β-diethylaminoethyl o- and m-trimethylsilylbenzoate allyl bromide, β-diethylaminoethyl o- and m-trimethylsilylbenzoate ethyl p-toluenesulfonate, and the like.

*Example 2.—β-Diethylaminopropyl p-trimethylsilylbenzoate*

Following the procedure described in Example 1 except for the use of 7.4 grams (0.04 mole) of p-trimethylsilylbenzoyl chloride in 45 milliliters of benzene and the replacement of β-diethylaminoethanol by 4.58 grams (0.04 mole) of β-diethylaminopropanol in forty milliliters of benzene, β-diethylaminopropyl p-trimethylsilylbenzoate hydrochloride is obtained. On successive recrystallizations from benzene and acetone, substantially pure β-diethylaminopropyl p-trimethylsilylbenzoate hydrochloride is obtained melting between 158 and 159 degrees centigrade.

*Analysis.*—Calculated for $C_{17}H_{30}ClNO_2Si$: N, 4.08. Found: N, 4.36; N, 4.38.

β-Diethylaminopropyl p-trimethylsilylbenzoate hydrochloride exhibits antibacterial activity and particularly against *S. haemolyticus* and *M. avium*.

On treating an aqueous solution of β-diethylaminopropyl p-trimethylsilylbenzoate hydrochloride with concentrated ammonium hydroxide, the corresponding β-diethylaminopropyl p-trimethylsilylbenzoate is obtained.

On reacting β-diethylaminopropyl p-trimethylsilylbenzoate with acids such as, for example, acetic acid, citric acid, sulfuric acid, hydrogen chloride, hydrogen bromide, thiocyanic acid, lactic acid, tartaric acid, succinic acid, benzoic acid, salicyclic acid, picric acid, and the like, the corresponding β-diethylaminopropyl p-trimethylsilylbenzoate acetate, β-diethylaminopropyl p-trimethylsilylbenzoate citrate, β-diethylaminopropyl p-trimethylsilylbenzoate sulfate, β-diethylaminopropyl p-trimethylsilylbenzoate hydrochloride, β-diethylaminopropyl p-trimethylsilylbenzoate hydrobromide, β-diethylaminopropyl p-trimethylsilylbenzoate thiocyanate, β-diethylaminopropyl p-trimethylsilylbenzoate lactate, β-diethylaminopropyl p-trimethylsilylbenzoate tartrate, β-diethylaminopropyl p-trimethylsilylbenzoate succinate, β-diethylaminopropyl p-trimethylsilylbenzoate benzoate, β-diethylaminopropyl p-trimethylsilylbenzoate salicylate, β-diethylaminopropyl p-trimethylsilylbenzoate picrate, and the like, are obtained.

By heating a benzene solution of β-diethylaminopropyl p-trimethylsilylbenzoate with selected esters such as methyl bromide, ethyl chloride, benzyl chloride, methyl iodide, cetyl bromide, myristyl iodide, lauryl bromide, allyl bromide, ethyl p-toluenesulfonate, and the like, the corresponding quaternary ammonium salts of β-diethylaminopropyl p-trimethylsilylbenzoate are obtained such as, for example, β-diethylaminopropyl p-trimethylsilylbenzoate methobromide, β-diethylaminopropyl p-trimethylsilylbenzoate ethochloride, β-diethylaminopropyl p-trimethylsilylbenzoate benzyl chloride, β-diethylaminopropyl p-trimethylsilylbenzoate methiodide, β-diethylaminopropyl p-trimethylsilylbenzoate cetyl bromide, β-diethylaminopropyl p-trimethylsilylbenzoate myristyl iodide, β-diethylaminopropyl p-trimethylsilylbenzoate lauryl bromide, β-diethylaminopropyl p-trimethylsilylbenzoate allyl bromide, β-diethylaminopropyl p-trimethylsilylbenzoate ethyl p-toluenesulfonate, and the like.

Similarly, on substituting an o- or m-trimethylsilylbenzol halide for p-trimethylsilylbenzoyl chloride in the above reaction, the corresponding β-diethylaminopropyl o- and m-trimethylsilylbenzoate is obtained. Acid addition and quaternary ammonium salts of these tertiary amines are likewise prepared by the procedure described in Example 1.

*Example 3.—β-Dimethylaminoethyl p-trimethylsilylbenzoate*

Following the procedure described in Example 1 except for the use of 7.4 grams (0.04 mole) of p-trimethylsilylbenzoyl chloride in thirty milliliters of benzene and the replacement of β-diethylaminoethanol by 3.1 grams (0.04 mole) of β-dimethylaminoethanol in forty milliliters of benzene, β-dimethylaminoethyl p-trimethylsilylbenzoate hydrochloride is obtained in crude form. This crude product is dissolved in water and made basic with concentrated ammonium hydroxide. The free base, β-dimethylaminoethyl p-trimethylsilylbenzoate, is obtained by extracting the mixture with ether, drying the ether solution with anhydrous sodium sulfate, and then filtering.

The ether solution of β-dimethylaminoethyl p-trimethylsilylbenzoate is treated with an equal volume of ether saturated with hydrogen chloride and the solution is allowed to cool overnight at a low temperature. The resulting β-dimethylaminoethyl p-trimethylsilylbenzoate hydrochloride is collected by suction filtration and on recrystallization from ethyl acetate, substantially pure β-dimethylaminoethyl p-trimethylsilylbenzoate hydrochloride is obtained melting between 159 and 161 degrees centigrade.

*Analysis.*—Calculated for $C_{14}H_{24}ClNO_2Si$: N, 4.65. Found: N, 4.90; N, 4.65.

β-Dimethylaminoethyl p-trimethylsilylbenzoate hydrochloride exhibits antibacterial activity, especially against *M. avium*.

On reacting β-dimethylaminoethyl p-trimethylsilylbenzoate with acids such as acetic acid, citric acid, sulfuric acid, hydrogen chloride, hydrogen bromide, thiocyanic acid, lactic acid, tartaric acid, succinic acid, benzoic acid, salicylic acid, picric acid, and the like, the corresponding acid addition salts are obtained such as, for example, β - dimethylaminoethyl p - trimethylsilylbenzoate acetate, β - dimethylaminoethyl p - trimethylsilylbenzoate citrate, β - dimethylaminoethyl p - trimethylsilylbenzoate sulfate, β-dimethylaminoethyl p-trimethylsilylbenzoate hydrochloride, β - dimethylaminoethyl p-trimethylsilylbenzoate hydrobromide, β - dimethylaminoethyl p - trimethyl - silylbenzoate thiocyanate, β - dimethylaminoethyl p - trimethylsilylbenzoate lactate, β - dimethylaminoethyl p-trimethylsilylbenzoate tartrate, β-dimethylaminoethyl p-trimethylsilylbenzoate succinate, β-dimethylaminoethyl p-trimethylsilylbenzoate benzoate, β-dimethylaminoethyl p-trimethylsilylbenzoate salicylate, β-dimethylaminoethyl p-trimethylsilylbenzoate picrate, and the like.

On reacting a benzene solution of β-dimethylaminoethyl p-trimethylsilylbenzoate with selected esters such as, for example, methyl bromide, ethyl chloride, benzyl chloride, methyl iodide, cetyl bromide, myristyl iodide, lauryl bromide, allyl bromide, ethyl p-toluenesulfonate, and the like, the corresponding quaternary ammonium salts are obtained such as, for example, β-dimethylaminoethyl p-trimethylsilylbenzoate methobromide, β-dimethylaminoethyl p-trimethylsilylbenzoate ethochloride, β-dimethylaminoethyl p-trimethylsilylbenzoate benzyl chloride, β-dimethylaminoethyl p-trimethylsilylbenzoate methiodide, β-dimethylaminoethyl p-trimethylsilylbenzoate cetyl bromide, β-dimethylaminoethyl p-trimethylsilylbenzoate myristyl iodide, β-dimethylaminoethyl p-trimethylsilylbenzoate lauryl bromide, β-dimethylaminoethyl p-trimethylsilylbenzoate allyl bromide, β-dimethylaminoethyl p-trimethylsilylbenzoate ethyl p-toluenesulfonate, and the like.

Similarly, on substituting an o- or m-trimethylsilylbenzoyl halide for p-trimethylsilylbenzoyl chloride in the above reaction, the corresponding β-dimethylaminoethyl o- or m-trimethylsilylbenzoate is obtained. Acid addition and quaternary ammonium salts of these tertiary amines are likewise prepared by the procedure described in Example 1.

*Example 4.—γ-Diethylaminopropyl p-trimethylsilylbenzoate*

Following the procedure described in Example 1 except for the use of five grams (0.02 mole) of p-trimethylsilylbenzoyl chloride in 25 milliliters of benzene and the replacement of β-diethylaminoethanol by 3.3 grams (0.02 mole) of γ-diethylaminopropanol in forty milliliters of benzene, γ-diethylaminopropyl p-trimethylsilylbenzoate hydrochloride is obtained in crude form. On recrystallization from an ethyl acetate-ethanol mixture, there is obtained γ-diethylaminopropyl p-trimethylsilylbenzoate hydrochloride in substantially pure form melting between 187 and 188 degrees centigrade, and weighing 6.4 grams (72 percent yield).

*Analysis.*—Calculated for $C_{17}H_{30}ClNO_2Si$: N, 4.08. Found: N, 4.28; N, 4.16.

γ-Diethylaminopropyl p-trimethylsilylbenzoate hydrochloride exhibits antibacterial activity, especially against *S. haemolyticus* and *M. avium*.

On treating an aqueous solution of γ-diethylaminopropyl p-trimethylsilylbenzoate hydrochloride with concentrated ammonium hydroxide, the free base, γ-diethylaminopropyl p-trimethylsilylbenzoate, is obtained.

On reacting γ-diethylaminopropyl p-trimethylsilylbenzoate with acids such as, for example, acetic acid, citric acid, sulfuric acid, hydrogen chloride, hydrogen bromide, thiocyanic acid, lactic acid, tartaric acid, succinic acid, benzoic acid, salicylic acid, picric acid, and the like, the corresponding acid addition salts are obtained such as, for example, γ-diethylaminopropyl p-trimethylsilylbenzoate acetate, γ-diethylaminopropyl p-trimethylsilylbenzoate citrate, γ-diethylaminopropyl p-trimethylsilylbenzoate sulfate, γ-diethylaminopropyl p-trimethylsilylbenzoate hydrochloride, γ-diethylaminopropyl p-trimethylsilylbenzoate hydrobromide, γ-diethylaminopropyl p-trimethylsilylbenzoate thiocyanate, γ-diethylaminopropyl p-trimethylsilylbenzoate lactate, γ-diethylaminopropyl p-trimethylsilylbenzoate tartrate, γ-diethylaminopropyl p-trimethylsilylbenzoate succinate, γ-diethylaminopropyl p-trimethylsilylbenzoate benzoate, γ-diethylaminopropyl p-trimethylsilylbenzoate salicylate, γ-diethylaminopropyl p-trimethylsilylbenzoate picrate, and the like.

By heating a benzene solution of γ-diethylaminopropyl p-trimethysilylbenzoate with selected esters such as, for example, methyl bromide, ethyl chloride, benzyl chloride, methyl iodide, cetyl bromide, myristyl iodide, lauryl bromide, allyl bromide, ethyl p-toluenesulfonate, and the like, the corresponding quaternary ammonuim salts are obtained such as, for example, γ-diethylaminopropyl p-trimethylsilylbenzoate methobromide, γ-diethylaminopropyl p-trimethylsilylbenzoate ethochloride, γ-diethylaminopropyl p-trimethylsilylbenzoate benzyl chloride, γ-diethylaminopropyl p-trimethylsilylbenzoate methiodide, γ-diethylaminopropyl p-trimethylsilylbenzoate cetyl bromide, γ-diethylaminopropyl p-trimethylsilylbenzoate myristyl iodide, γ-diethylaminopropyl p-trimethylsilylbenzoate lauryl bromide, γ-diethylaminopropyl p-trimethylsilylbenzoate allyl bromide, γ-diethylaminopropyl p-trimethylsilylbenzoate ethyl p-toluenesulfonate, and the like.

Similarly, on substituting an o- or m-trimethylsilylbenzoyl halide for p-trimethylsilylbenzoyl chloride in the above reaction, the corresponding γ-diethylaminopropyl o- or m-trimethylsilylbenzoate is obtained. Acid addition and quaternary ammonium salts of these tertiary amines are prepared by the procedure described in Example 1.

*Example 5.—1-methyl-2-dimethylaminoethyl p-trimethylsilylbenzoate*

Following the procedure described in Example 1 except for the use of five grams (0.02 mole) of p-trimethylsilylbenzoyl chloride in 25 milliliters of benzene, and the replacement of β-diethylaminoethanol by 2.5 grams (0.02 mole) of 1-methyl-2-dimethylaminoethanol in 25 milliliters of benzene, 1-methyl-2-dimethylaminoethyl p-trimethylsilylbenzoate hydrochloride is obtained. On recrystallization from ethyl acetate, there is obtained substantially pure 1-methyl-2-dimethylaminoethyl p-trimethylsilylbenzoate hydrochloride melting between 160 and 162 degrees centigrade.

*Analysis.*—Calculated for $C_{15}H_{26}ClNO_2Si$: N, 4.44. Found: N, 4.44; N, 4.49.

On treating an aqueous solution of 1-methyl-2-dimethylaminoethyl β-trimethylsilylbenzoate hydrochloride with concentrated ammonium hydroxide by the procedure set forth in Example 1, the free base, 1-methyl-2-dimethylaminoethyl p-trimethylsilylbenzoate, is obtained.

On reacting 1-methyl-2-dimethylaminoethyl p-trimethylsilylbenzoate with acids such as, for example, acetic acid, citric acid, sulfuric acid, hydrogen chloride, hydrogen bromide, thiocyanic acid, lactic acid, tartaric acid, succinic acid, benzoic acid, salicylic acid, picric acid, and the like, the corresponding acid addition salts are obtained such as, for example, 1-methyl-2-dimethylaminoethyl p-trimethylsilylbenzoate acetate, 1-methyl-2-dimethylaminoethyl p-trimethylsilylbenzoate citrate, 1-methyl-2-dimethylaminoethyl p-trimethylsilylbenzoate sulfate, 1-methyl-2-dimethylaminoethyl p-trimethylsilylbenzoate hydrochloride, 1-methyl-2-dimethylaminoethyl p-trimethylsilylbenzoate hydrobromide, 1-methyl-2-dimethylaminoethyl p-trimethylsilylbenzoate thiocyanate, 1-methyl-2-dimethylaminoethyl p-trimethylsilylbenzoate lactate, 1-methyl-2-dimethylaminoethyl p-trimethylsilylbenzoate tartrate, 1-methyl-2-dimethylaminoethyl p-trimethylsilylbenzoate succinate, 1-methyl-2-dimethylaminoethyl p-trimethylsilylbenzoate benzoate, 1-methyl-2-dimethylaminoethyl p-trimethylsilylbenzoate salicylate, 1-methyl-2-dimethylaminoethyl p-trimethylsilylbenzoate picrate, and the like.

By heating a benzene solution of 1-methyl-2-dimethylaminoethyl p-trimethylsilylbenzoate with selected esters such as, for example, methyl bromide, ethyl chloride, benzyl chloride, methyl iodide, cetyl bromide, myristyl iodide, lauryl bromide, allyl bromide, ethyl p-toluenesulfonate, and the like, the corresponding quaternary ammonium salts are obtained such as, for example, 1-methyl-2-dimethylaminoethyl p-trimethylsilylbenzoate methobromide, 1-methyl-2-dimethylaminoethyl p-trimethylsilylbenzoate ethochloride, 1-methyl-2-dimethylaminoethyl p-trimethylsilylbenzoate benzyl chloride, 1-methyl-2-dimethylaminoethyl p-trimethylsilylbenzoate methiodide, 1-methyl-2-dimethylaminoethyl p-trimethylsilylbenzoate cetyl bromide, 1-methyl-2-dimethylaminoethyl p-trimethylsilylbenzoate myristyl iodide, 1-methyl-2-dimethylaminoethyl p-trimethylsilylbenzoate lauryl bromide, 1-methyl-2-dimethylaminoethyl p-trimethylsilylbenzoate allyl bromide, 1-methyl-2-dimethylaminoethyl p-trimethylsilylbenzoate ethyl p-toluenesulfonate, and the like.

Similarly, on substituting an o- or m-trimethylsilylbenzoyl halide for p-trimethylsilylbenzoyl chloride in the above reaction, the corresponding 1-methyl-2-dimethylaminoethyl o- or m-trimethylsilylbenzoate is obtained. Acid addition and quaternary ammonium salts of these tertiary amines are prepared by the procedure described in Example 1.

*Example 6.—β-1-pyrrolidylethyl p-trimethylsilylbenzoate*

Following the procedure described in Example 1 except for the replacement of β-diethylaminoethanol by β-1-pyrrolidylethanol, β-1-pyrrolidylethyl p-trimethylsilylbenzoate is obtained.

The acid addition and quaternary ammonium salts of this compound are likewise prepared by the procedure described in Example 1.

Similarly, the β-1-pyrrolidylethyl o- and m-trimethylsilylbenzoates, including their acid addition and quaternary ammonium salts, are prepared by the procedure described in Example 1.

*Example 7.—β-4-morpholinylethyl p-trimethylsilylbenzoate*

Following the procedure described in Example 1 except for the replacement of β-diethylaminoethanol by β-4-morpholinylethanol, β - 4 - morpholinylethyl p-trimethylsilylbenzoate is obtained.

The acid addition and quaternary ammonium salts of this compound are likewise prepared by the procedure described in Example 1.

Similarly, the β-4-morpholinylethyl o- and m-trimethylsilylbenzoates, including their acid addition and quaternary ammonium salts, are prepared by the procedure described in Example 1.

Similarly, following the procedure described in Example 1 except for the use of other secondary-aminoalkanols, other aminoalkyl trimethylsilylbenzoates are obtained such as, for example, diethylaminomethyl trimethylsilylbenzoate, diethylaminobutyl trimethylsilylbenzoate, diethylaminoamyl trimethylsilylbenzoate, diethylaminohexyl trimethylsilylbenzoate, dipropylaminoethyl trimethylsilylbenzoate, dipropylaminopropyl trimethylsilylbenzoate, dibutylaminoethyl trimethylsilylbenzoate, dibutylaminopropyl trimethylsilylbenzoate, methylethylaminoethyl trimethylsilylbenzoate, methylpropylaminoethyl trimethylsilylbenzoate, methylhexylaminoethyl trimethylsilylbenzoate, dicyclobutylaminoethyl trimethylsilylbenzoate, dicyclohexylaminoethyl trimethylsilylbenzoate, methylbenzylaminomethyl trimethylsilylbenzoate, ethylbenzylaminoethyl trimethylsilylbenzoate, propylbenzylaminoethyl trimethylsilylbenzoate, dibenzylaminoethyl trimethylsilylbenzoate, diphenethylaminoethyl trimethylsilylbenzoate, pyrrolidylmethyl trimethylsilylbenzoate, pyrrolidylhexyl trimethylsilylbenzoate, pyrrolidylbutyl trimethylsilylbenzoate, piperidylethyl trimethylsilylbenzoate, morpholinylbutyl trimethylsilylbenzoate, methylpyrrolidylethyl trimethylsilylbenzoate, dimethylpyrrolidylethyl trimethylsilylbenzoate, ethylpyrrolidylethyl trimethylsilylbenzoate, methylpiperidylethyl trimethylsilylbenzoate, ethylpiperidylethyl trimethylsilylbenzoate, methylmorpholinylethyl trimethylsilylbenzoate, including isomeric forms thereof and acid addition and quaternary ammonium salts thereof.

Additional substituents can be introduced into the ring of the aforementioned aminoalkyl trimethylsilylbenzoates, which substituents include lower-alkoxy, halo groups, and the like. For example, starting with p-bromoanisole, β-dimethylaminoethyl 3 - trimethylsilyl-4-methoxybenzoate hydrochloride is obtained in the form of a hygroscopic solid. This salt can be converted to the free base by treatment with alkali. The reactions are set forth as follows:

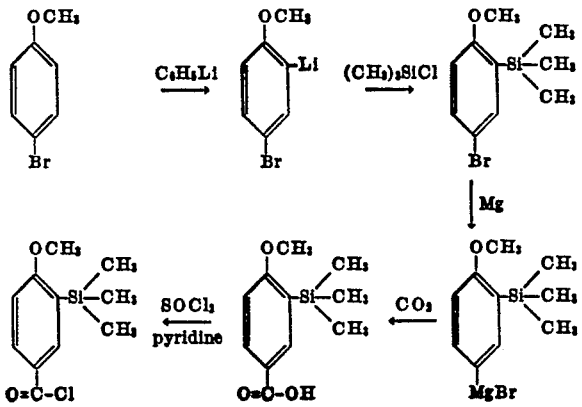

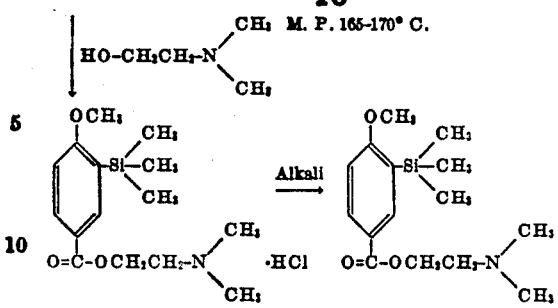

On replacing the starting material, p-bromoanisole, by other lower-alkyl ethers of p-bromophenol such as p-bromophenetole, p-bromophenyl propyl ether, p-bromophenylbutyl ether, p-bromophenylamyl ether, and the like, the corresponding substituted aminoalkyl trimethylsilylbenzoates are obtained.

It is to be understood that the invention is not to be limited to the exact details of operation or compounds shown and described herein, as obvious modifications and equivalents will be apparent to one skilled in the art. The invention is therefore to be limited only by the scope of the appended claims.

We claim:

1. Compounds of the formula:

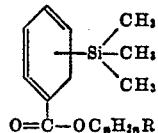

wherein $n$ is an integer from one to six inclusive and R is a secondary-amino radical, and acid addition and quaternary ammonium salts thereof.

2. Compounds of the formula:

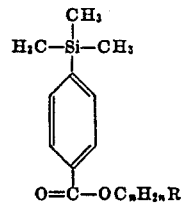

wherein $n$ and R are as defined in claim 1 and acid addition and quaternary ammonium salts thereof.

3. Compounds of the formula:

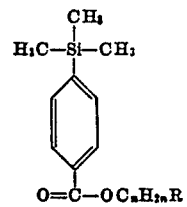

wherein $n$ is as defined in claim 2 and R is a dialkylamino radical, and acid addition and quaternary ammonium salts thereof.

4. β-Diethylaminoethyl p-trimethylsilylbenzoate and acid addition and quaternary ammonium salts thereof.

5. β-Diethylaminoethyl p-trimethylsilylbenzoate.

6. β-Diethylaminoethyl p-trimethylsilylbenzoate hydrochloride.

7. β-Diethylaminopropyl p-trimethylsilylbenzoate and acid addition and quaternary ammonium salts thereof.

8. β-Diethylaminopropyl p-trimethylsilylbenzoate.

9. β-Diethylaminopropyl p-trimethylsilylbenzoate hydrochloride.
10. β-Dimethylaminoethyl p-trimethylsilylbenzoate and acid addition and quaternary ammonium salts thereof.
11. β-Dimethylaminoethyl p-trimethylsilylbenzoate.
12. β-Dimethylaminoethyl p-trimethylsilylbenzoate hydrochloride.
13. γ-Diethylaminopropyl p-trimethylsilylbenzoate and acid addition and quaternary ammonium salts thereof.
14. γ-Diethylaminopropyl p-trimethylsilylbenzoate hydrochloride.
15. 1-methyl-2-dimethylaminoethyl p-trimethylsilylbenzoate and acid addition and quaternary ammonium salts thereof.
16. 1-methyl-2-dimethylaminoethyl p-trimethylsilylbenzoate hydrochloride.
17. A process for the preparation of compounds of the formula:

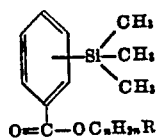

wherein $n$ is an integer from one to six inclusive and R is a secondary-amino radical, which comprises reacting a trimethylsilylbenzoyl halide with a secondary-aminoalkanol.

18. A process for the preparation of compounds of the formula:

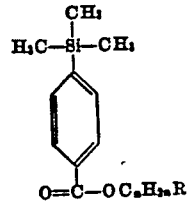

wherein $n$ and R are as defined in claim 17, which comprises reacting a p-trimethylsilylbenzoyl halide with a secondary-aminoalkanol.

19. The process of claim 18 when conducted under substantially anhydrous conditions.

20. The process of claim 19 wherein the p-trimethylsilylbenzoyl halide is p-trimethylsilylbenzoyl chloride.

References Cited in the file of this patent

UNITED STATES PATENTS

| | | |
|---|---|---|
| 1,358,750 | Kamm et al. | Nov. 16, 1920 |
| 2,647,137 | Frisch et al. | July 28, 1953 |

OTHER REFERENCES

Roberts et al.: "Jour. Am. Chem. Soc.," vol. 71 (1949), pp. 2923–6.

McIntyre et al.: "Nebraska State Med. Jour.," vol. 35 (1950), pp. 100–104.